B. FORD.
SECONDARY OR STORAGE BATTERY.
APPLICATION FILED DEC. 22, 1917.
1,256,006.
Patented Feb. 12, 1918.
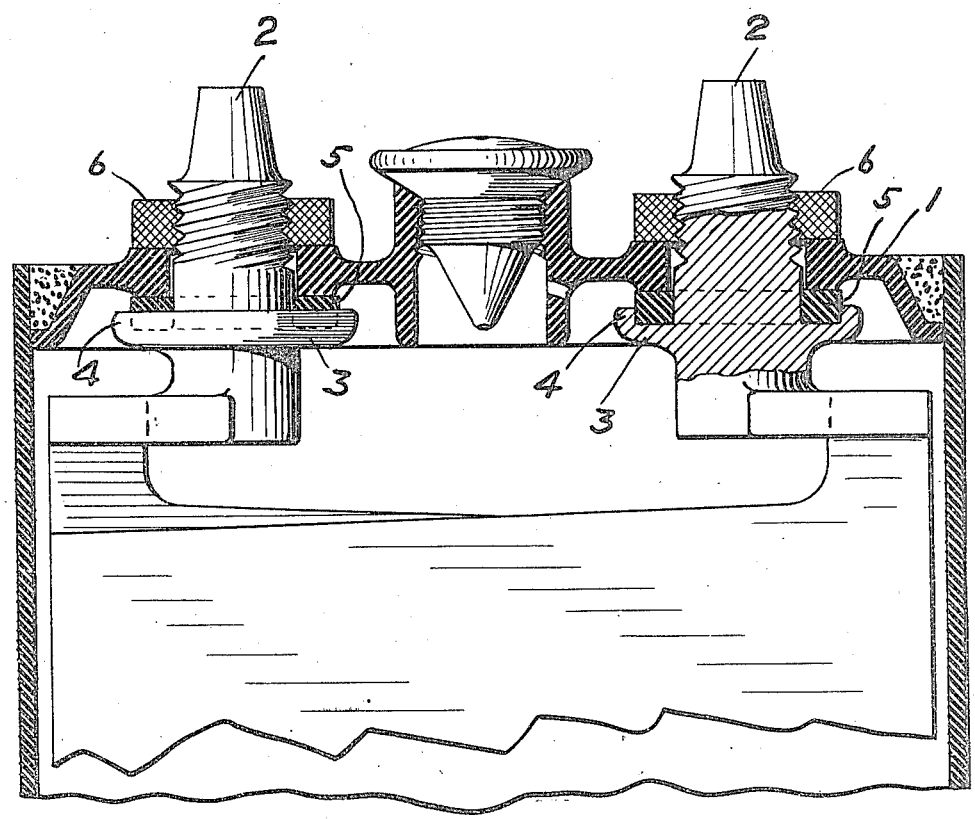
WITNESS:
Rob R Kitchel.
INVENTOR
Bruce Ford
BY
Augustus B. Stoughton.
ATTORNEY.

UNITED STATES PATENT OFFICE.

BRUCE FORD, OF PHILADELPHIA, PENNSYLVANIA.

SECONDARY OR STORAGE BATTERY.

1,256,006.   Specification of Letters Patent.   Patented Feb. 12, 1918.

Application filed December 22, 1917. Serial No. 208,488.

*To all whom it may concern:*

Be it known that I, BRUCE FORD, a citizen of the United States, and a resident of Philadelphia, in the county of Philadelphia and State of Pennsylvania, have invented certain new and useful Improvements in Secondary or Storage Batteries, of which the following is a specification.

The present invention relates more particularly to retaining the gasket employed to seal the terminal post to the cell cover, and its principal object is to refer the stress incident to confining the gasket against radial expansion when compressed to the metal plate structure which is well adapted to resist it.

The invention will be claimed at the end hereof, but will be first described in connection with the embodiment of it chosen from other embodiments for illustration in the accompanying drawing, which is a sectional view of parts of a storage battery showing in elevation and section features of the invention.

In the drawing 1 is the cell cover of rubber material, 2 is a metal terminal post extending through the cover and provided with an annular flange 3 having a marginal metal lip 4 confronting the underside of the cover and constituting a socket seat. 5, is a gasket of rubber material, as so called soft rubber, arranged between the flange and cover and confined by the metal lip 4 against radial expansion when compressed by the seal-nut 6. Since the confining lip 4 is of metal it is strong and well adapted to resist the stress exerted upon it by the gasket 5 and since the flange and terminal post are of metal, the lip can be readily formed as by casting and without affecting the terminal post or flange. The advantage of confining the gasket 5 against radial expansion is evident for if not confined and subjected to compression it would spread out radially and so break or tend to break the seal.

The portion of the underface of the cover upon which the gasket 5 bears is smooth and may consist of the smooth face of a boss, as shown, or of the flat underside of the cover in cases where the boss is omitted. Inasmuch as the underface of the cover, or boss thereon, is smooth it can be readily formed and the cover made without being under internal stress or strain and without being warped or deformed.

What I claim is:

1. In a storage battery the combination of a cell cover of relatively hard rubber material, a seal-nut, a terminal post extending through the cover and provided with an annular flange having a marginal metal lip confronting the underside of the cover, and a gasket of relatively soft rubber material arranged between the flange and cover and confined by the metal lip against radial expansion when compressed by the seal-nut.

2. In a storage battery the combination of a cell cover of relatively hard material, a metal terminal post extending through the cover and provided with a flange having a metal lip confronting the underside of the cover, and a gasket of relatively soft material arranged between the flange and the cover and confined by the metal lip against radial expansion, and means for compressing the cover against the gasket to constitute a seal.

BRUCE FORD.